(12) United States Patent
Knippel et al.

(10) Patent No.: US 8,316,193 B2
(45) Date of Patent: Nov. 20, 2012

(54) OPTIMIZING SEGMENT ACCESS IN BINARY TRANSLATION

(75) Inventors: Ross Charles Knippel, Half Moon Bay, CA (US); Jeffrey W. Sheldon, Mountain View, CA (US); Ole Agesen, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 534 days.

(21) Appl. No.: 12/629,682

(22) Filed: Dec. 2, 2009

(65) Prior Publication Data

US 2011/0131372 A1 Jun. 2, 2011

(51) Int. Cl.
*G06F 12/00* (2006.01)

(52) U.S. Cl. ............. 711/154; 711/6; 711/156; 711/200

(58) Field of Classification Search ........................ None
See application file for complete search history.

(56) References Cited

U.S. PATENT DOCUMENTS

2002/0124194 A1* 9/2002 Dawkins et al. .............. 713/310

* cited by examiner

*Primary Examiner* — Shawn X Gu

(57) ABSTRACT

A mechanism for a binary translator to emit code that will pre-generate information about a memory segment when a segment selector is assigned to a segment register. The binary translator emits code that will be executed when a memory access using that segment register is encountered and the emitted code will access the pre-generated information when evaluating the memory access request. Memory accesses, where a number of bytes being accessed is less than or equal to a predetermined value, are validated with a number of steps in the code emitted by the binary translator.

33 Claims, 10 Drawing Sheets

| SEGMENT REGISTER | SEGMENT SELECTOR | SPAN16R | SPAN16W | SPAN32R | SPAN32W | SPAN16R_BIG | SPAN16W_BIG | SPAN32R_BIG | SPAN32W_BIG | LOW ADDRESS |
|---|---|---|---|---|---|---|---|---|---|---|
| SR-1 | SEGSEL-1 | | | | | | | | | |
| SR-2 | SEGSEL-n | | | | | | | | | |
| SR-3 | SEGSEL-4 | | | | | | | | | |
| | | | | | | | | | | |
| | | | | | | | | | | |
| | | | | | | | | | | |
| | | | | | | | | | | |

300-1 points to SR-1 row; 300-2 points to SR-2 row.

*Fig. 3*

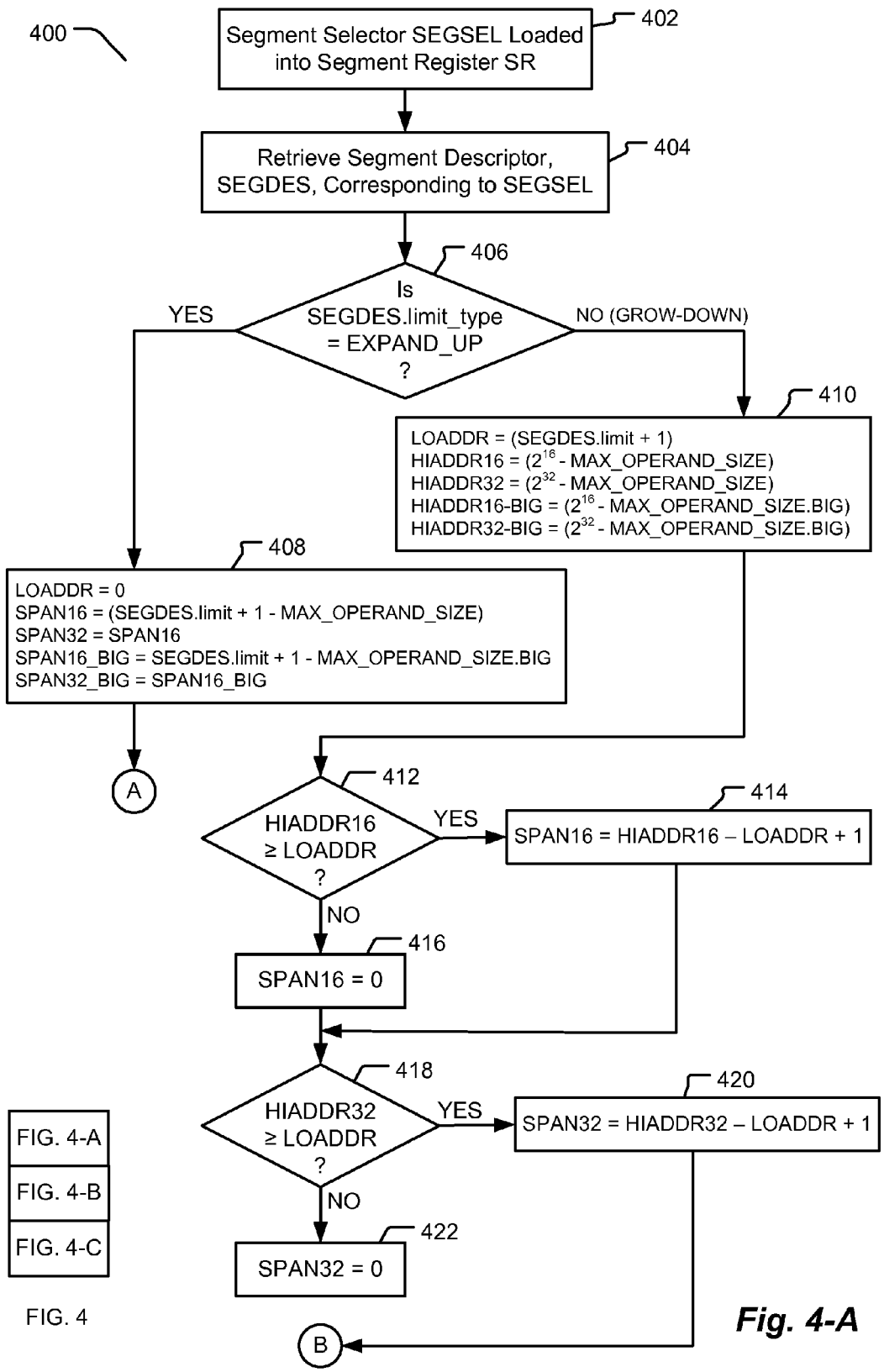
Fig. 4-A

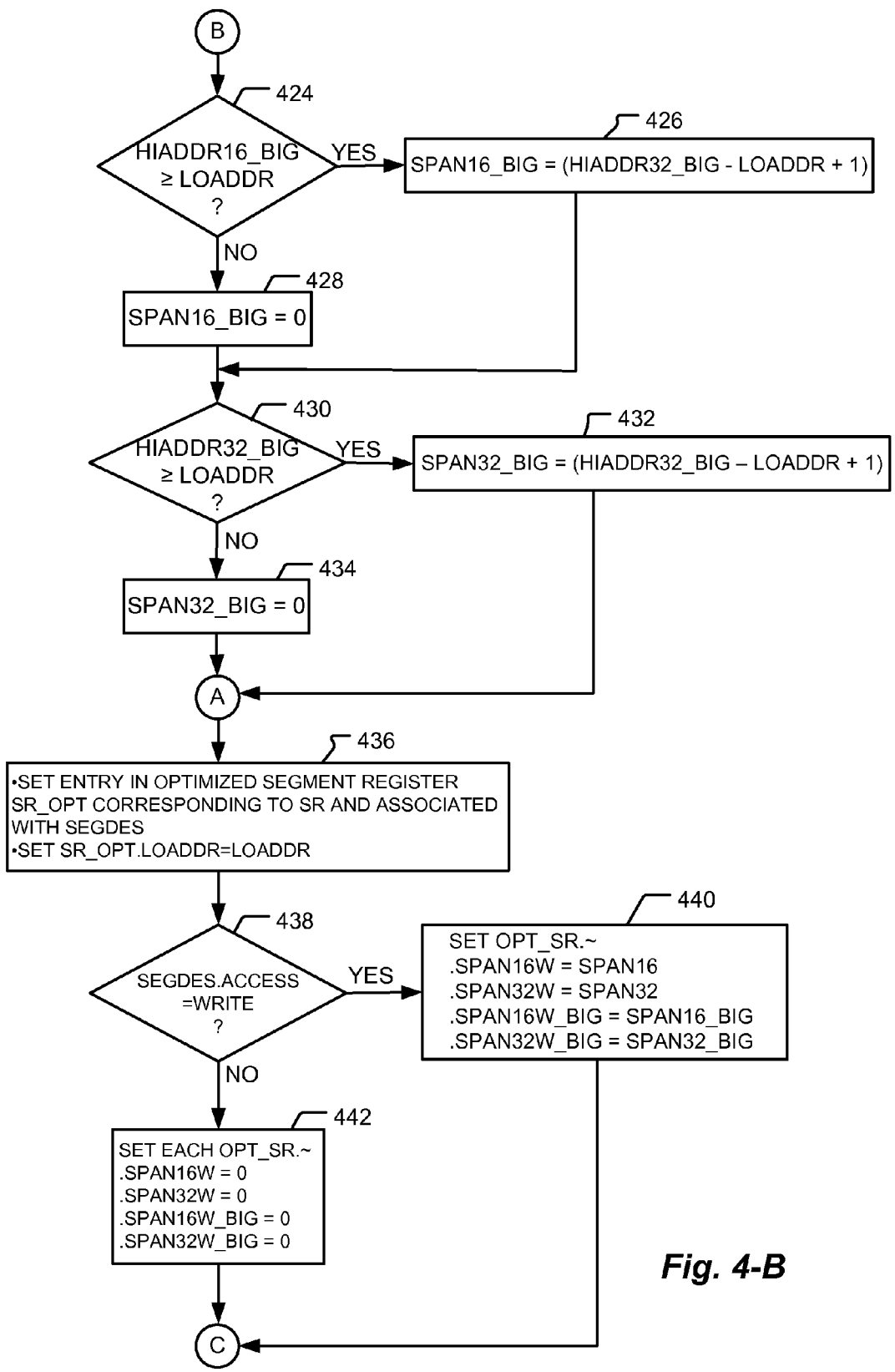
Fig. 4-B

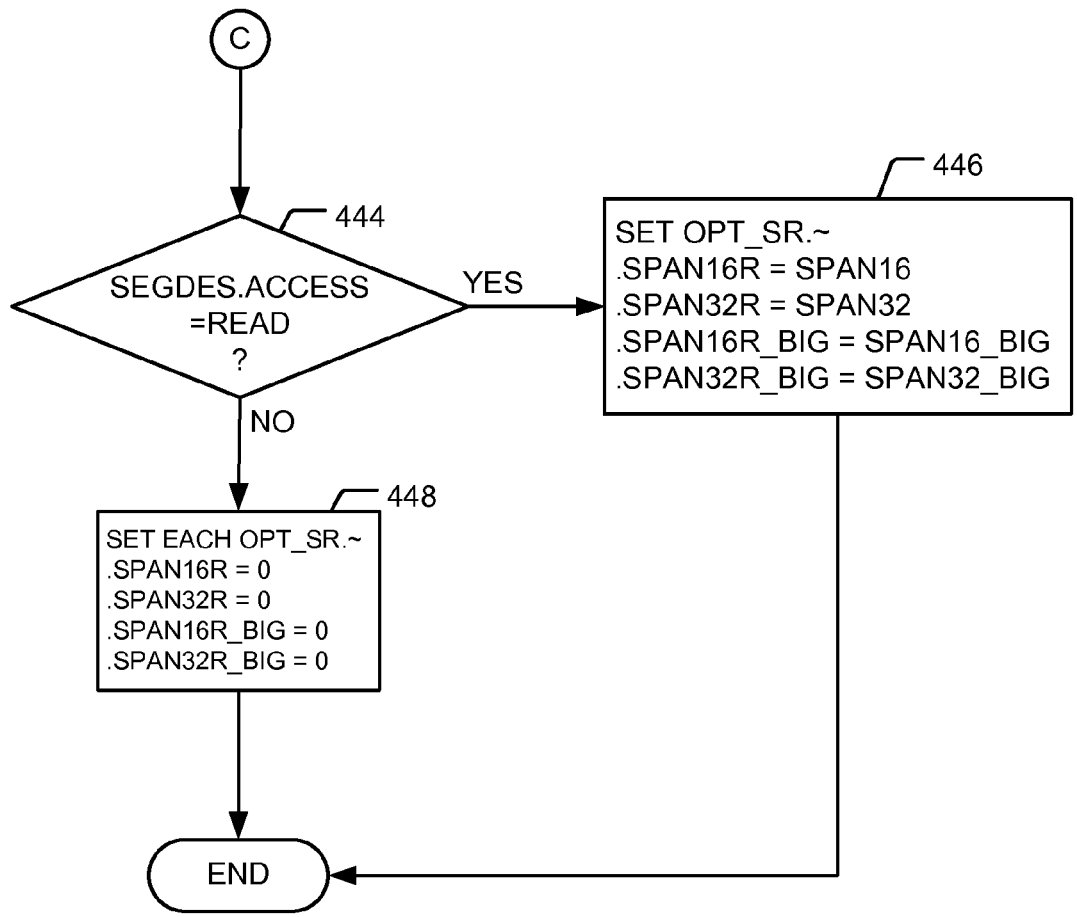
Fig. 4-C

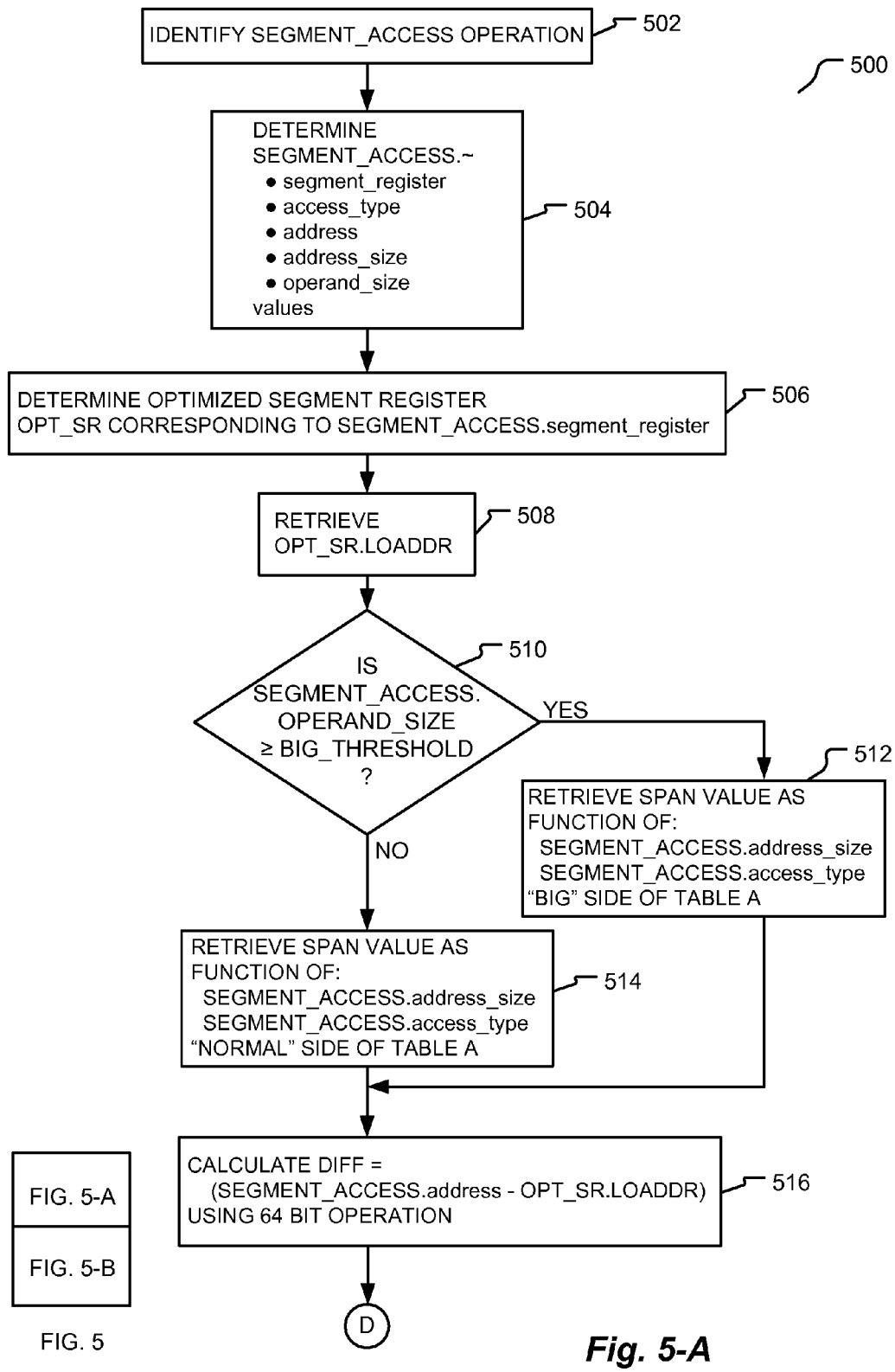

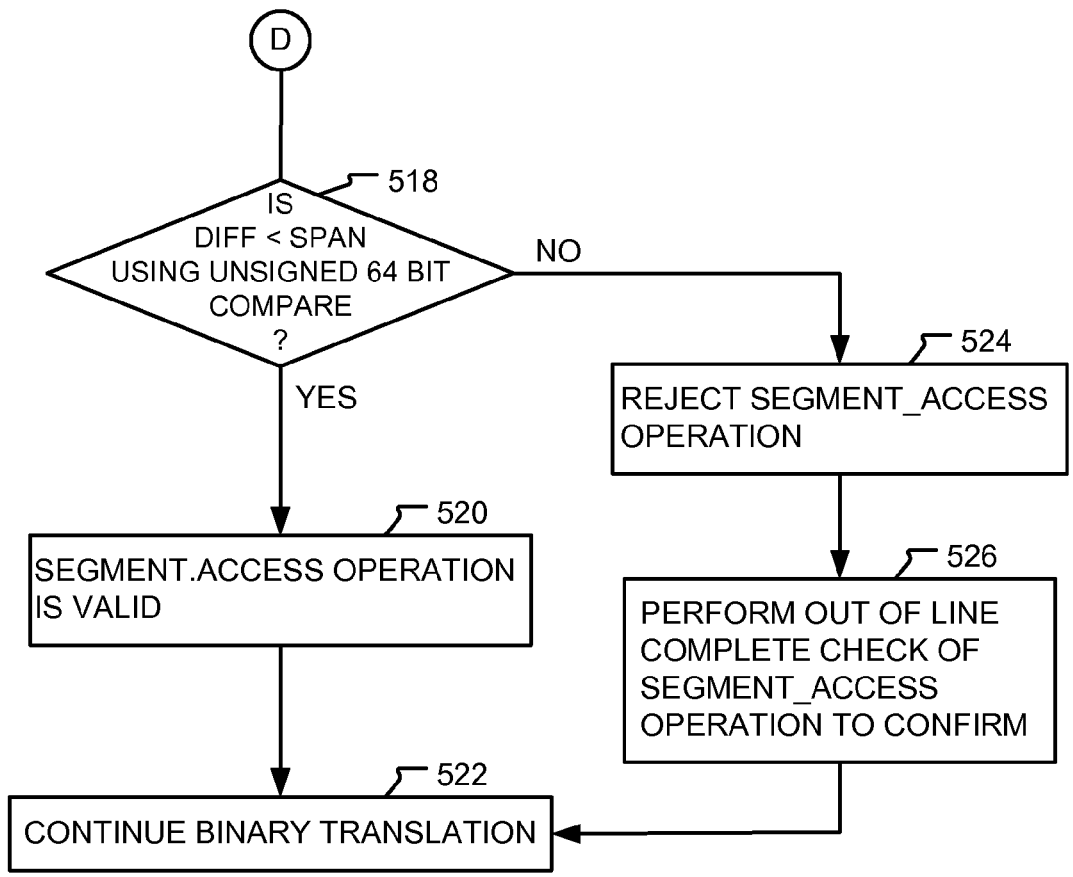
Fig. 5-B

| TABLE A | NORMAL | | BIG | |
|---|---|---|---|---|
| | SEGMENT_ACCESS.access_type | | SEGMENT_ACCESS.access_type | |
| SEGMENT_ACCESS.address_size | READ | WRITE | READ | WRITE |
| 16 | SR_OPT.SPAN16R | SR_OPT.SPAN16W | SR_OPT.SPAN16R_BIG | SR_OPT.SPAN16W_BIG |
| 32 | SR_OPT.SPAN32R | SR_OPT.SPAN32W | SR_OPT.SPAN32R_BIG | SR_OPT.SPAN32W_BIG |

*Fig. 6*

OPTIMIZING SEGMENT ACCESS IN BINARY TRANSLATION

FIELD OF THE INVENTION

Embodiments of the present invention relate generally to the field of binary translation in virtualized computer systems and, more specifically, to translating and verifying segmented memory accesses.

BACKGROUND OF THE INVENTION

In computing, virtualization hides the physical characteristics of a computing platform from the users. A user sees an abstract, emulated, computing platform and is unaware that applications are not running directly on the underlying hardware.

In a virtualized system a virtual machine creates "a simulated computer environment" for its guest software. The guest software may include user applications and complete operating systems. The guest software executes as if it were running directly on the underlying physical hardware and is, otherwise, unaware that it is operating in a virtualized environment. To provide isolation between virtual machines and between virtual machines and host software, most virtualized systems control access to physical system resources. Guests may also be restricted from accessing specific peripheral devices, or may be limited to a subset of the device's native capabilities, depending on the hardware access policy implemented by the virtualization host. Similarly, guests may be confined to a subset of the host's memory. This separation or control has allowed virtualization to run multiple independent "machines" on a single hardware platform, assuring security and minimizing, actually eliminating, interference between virtual machines.

Often, in implementing virtualized systems, binary translation is applied. Binary translation is the translation of instructions or code in one instruction set or language, i.e., a "source," into another through translation of the code. Sequences of instructions are translated from the source to the target instruction set.

"Full virtualization" provides a virtual machine environment that is a complete simulation of the underlying hardware. Software, e.g., almost any operating system, that is otherwise capable of running on the hardware is run in the virtual machine. The concept of full virtualization is well known to those of ordinary skill in the art.

Some virtualization products from VMware Inc., Palo Alto, Calif., employ binary translation to modify x86 software "on the fly." Instructions, i.e., input language (IL), that may contain privileged instructions that could affect the host, as a whole, or other virtual machines, are replaced with a safe sequence of instructions, i.e., output language (OL). It should be noted that IL and OL may be the same in some instances, e.g., x86 instructions.

As known to those of ordinary skill in the art, there are privileged instructions that are kept for Operating System or Kernel applications and are not meant to be used by user written programs. In a virtualized system, these privileged instructions often cannot be executed unmodified. Accordingly, the binary translator replaces the privileged instructions with an equivalent "safe" sequence of instructions that has the intended effect of the privileged instruction(s) on the virtual machine's state.

The binary translator is usually implemented as a software module running, for example, in a virtual machine monitor (VMM) or hypervisor. As is known, the binary translation of some instructions or some series of instructions requires non-trivial code transformation, possibly resulting in OL code that runs significantly slower than the unmodified IL code would have done. Further, the cost of the translation process itself also matters when using dynamic translation, but usually to a much lesser degree as code is generally translated once but executed many times.

The Intel Architecture Software Developer's Manual, Volume 3: System Programming, copyright 1999 by Intel Corporation, incorporated herein by reference for all purposes, describes that, in some computers, physical memory is organized into a plurality of memory segments. Referring now to FIG. 1, a memory space 100 is divided into a plurality of memory segments 102-1 . . . 102-n. Each memory segment 102 has a segment descriptor SEGDES associated with it that defines properties of that memory segment such as:

a) access_rights:
  readable,
  readable_and_writable, or
  neither_readable_nor_writable
b) limit_type: expand_up or grow_down
c) limit: depending on limit_type this is either:
  expand_up: the highest valid address, or
  grow_down: one less than the lowest valid address.
d) limit_size: maximum number of bits in the limit (16 or 32).

As known, although not shown in FIG. 1, memory segments may overlap in a memory, be nested within each other or leave gaps resulting in some portion of memory being inaccessible through any segment.

A segment descriptor table 104 is provided that contains the segment descriptors SEGDES with a corresponding reference referred to as a segment selector, SEGSEL. The segment selector SEGSEL is not stored in the table but is used to index the table. Thus, the segment descriptor table 104 has a plurality of segment descriptor entries, 106-1 . . . 106-n, with a segment selector SEGSEL indexing a segment descriptor SEGDES.

Further, referring now to FIG. 2, a plurality of segment registers 202, 204, 206 are provided. As known, the number m of segment registers provided is much less than the number n of different segment selectors available for use, i.e., m<<n. These registers are shown in the form of a table for descriptive purposes only. As is generally known to one of ordinary skill in the art, a segment register 202, 204, 206 contains a cross-reference of a segment selector SEGSEL to a segment descriptor SEGDES. In general, a segment register is provided for a particular type of information in memory, for example, a segment register SR-1 may identify where data is stored in memory and another segment register SR-2 may identify where application code is stored.

An instruction may contain one or more memory references. Each memory reference, called a segment_access below, accesses the memory of a segment by specifying:
  a segment register,
  an address within the segment,
  the number of bytes to be accessed, and
  the type of requested access, i.e., read, write or read/write.
    (Where read/write represents a read followed by a write.)

Prior to allowing an instruction to access the segment's memory, it must be determined whether or not the request is proper. Thus the request must meet the access rights and the address limits of the segment for the range of addresses attempted to be read from or written to, as defined by the corresponding segment descriptor. It is also noted that, with respect to the checking of memory segment access rights, write authorization always includes read authorization.

A segment check ensures that a requested segment_access is valid for a given segment descriptor SEGDES by determining if:

a) the type of access (read or write) is allowed, and b) the range of bytes to be accessed [address, address+ operand_size−1] is valid As known, in order to be valid, a segment_access request has to satisfy certain conditions on the segment_descriptor referenced by the segment_register in the access request.

The conditions are evaluated, generally, according to the following:

a) read segment_register specified by the segment_access-.segment_register to obtain the cached segment_descriptor information;

b) check that segment_access.access_type is allowed by the segment_descriptor.access_rights;

c) check that the address range can be accessed.

From the perspective of a binary translator, verifying the access to a segment's memory is complicated as hardware segmentation in OL cannot be used because OL, unlike IL, in most cases, almost certainly will not have segmentation. The OL language is deficient, therefore, compared with the IL language which most likely has segmentation. Because hardware cannot be used to do the segment checks and address conversion in OL, another mechanism must be provided.

Accordingly, it would be advantageous if a mechanism were provided for more efficient runtime translations of segmented memory access requests emitted by a binary translator.

BRIEF SUMMARY OF THE INVENTION

Embodiments of the present invention provide a mechanism for the runtime translations emitted by a binary translator to pre-generate information about a memory segment when a segment selector is assigned to a segment register. The binary translator emits code that will be executed when a memory access using that segment register is encountered and the emitted code will access the pre-generated information when evaluating the memory access request. Memory accesses, where a number of bytes being accessed is less than or equal to a predetermined value, are advantageously validated with a minimal number of steps in the code emitted by the binary translator.

BRIEF DESCRIPTION OF THE SEVERAL VIEWS OF THE DRAWINGS

Various aspects of at least one embodiment of the present invention are discussed below with reference to the accompanying figures. In the figures, which are not intended to be drawn to scale, each identical or nearly identical component that is illustrated in the various figures is represented by a like numeral. For purposes of clarity, not every component may be labeled in every drawing. The figures are provided for the purposes of illustration and explanation and are not intended as a definition of the limits of the invention. In the figures:

FIG. 3 is a block diagram of optimized segment registers in accordance with an embodiment of the present invention;

FIGS. 4, 4-A, 4-B and 4-C represent a method for generating the data to be placed in an optimized segment register in accordance with an embodiment of the present invention;

FIGS. 5, 5-A and 5-B represent a method for validating a segmented memory access in accordance with an embodiment of the present invention;

FIG. 6 is a table used by the method of FIGS. 5, 5-A and 5-B to validate the segmented memory access.

DETAILED DESCRIPTION OF THE INVENTION

Figure 1:
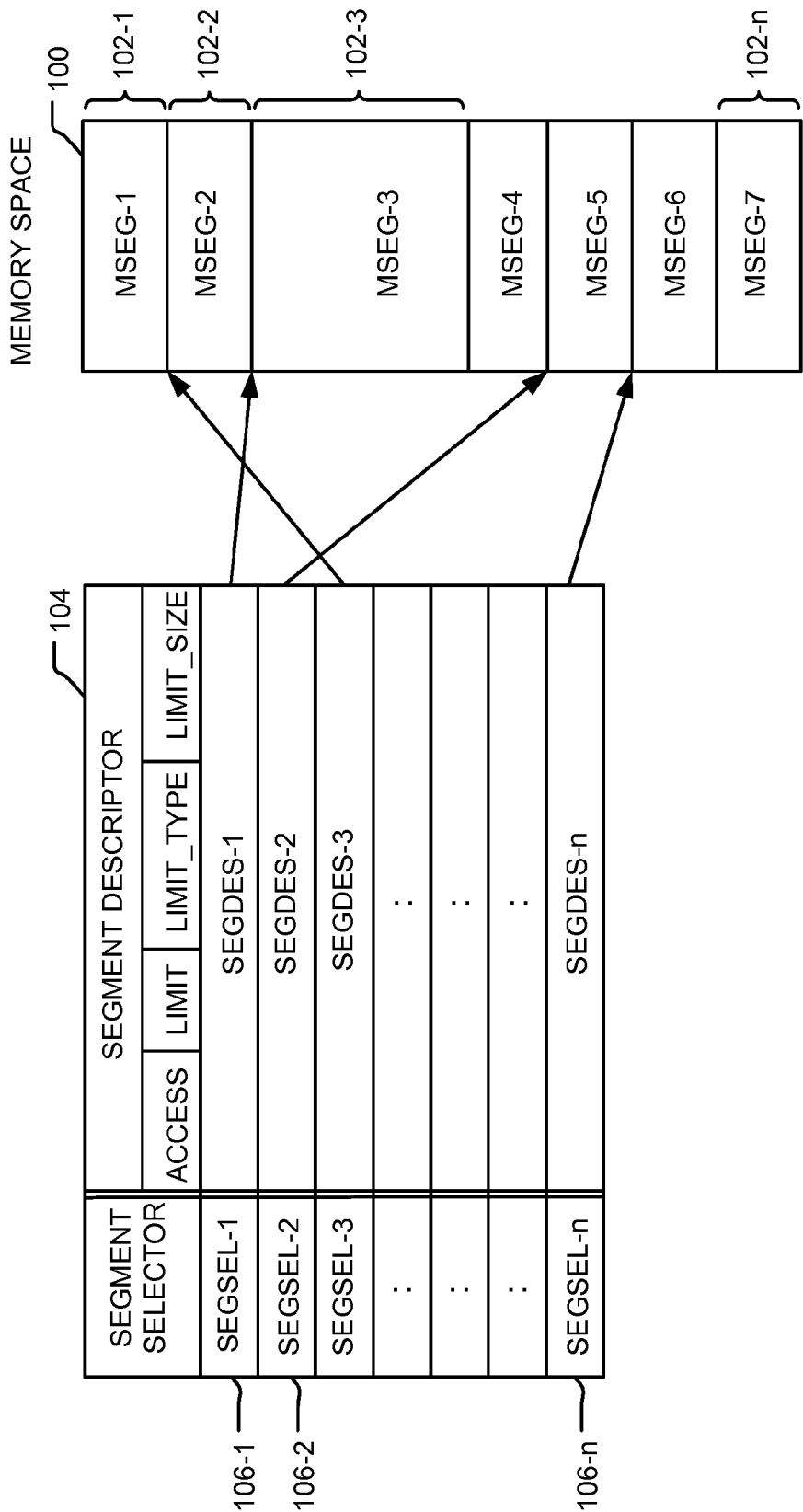
FIG. 1 is a block diagram representing memory segments, segment selectors and segment descriptors.
Figure 2:
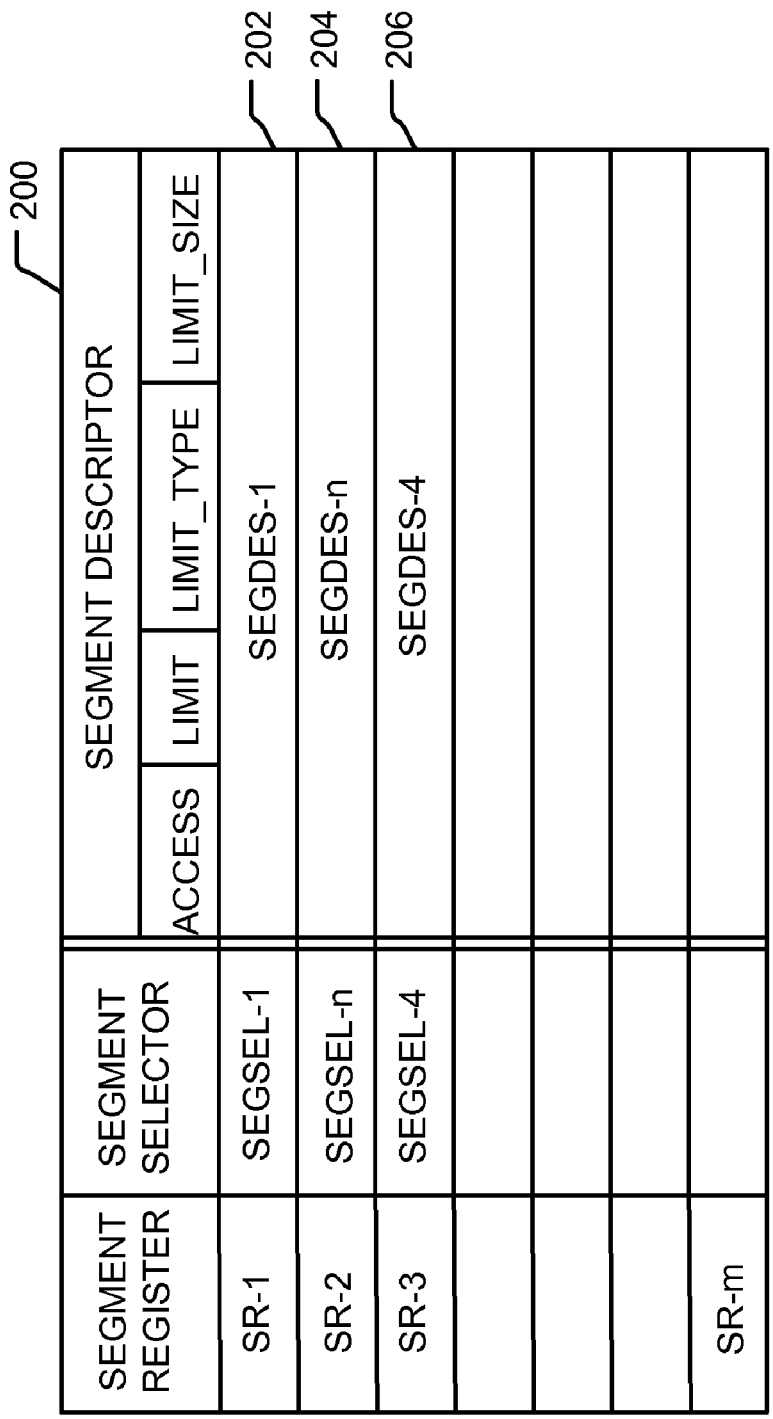
FIG. 2 is a block diagram representing segment registers.

In applications that access segmented memory it has been observed that: a) verifying the access to a segment's memory is relatively complicated, and b) it is much more frequent to access a segment's memory than it is to assign a segment selector to a segment register.

When a selector is assigned to a segment register, the corresponding descriptor is cached for later access.

For example (using x86 syntax):

$mov\ \%\ fs,\ \%\ ax$; set segment register $\%\ fs$ to the selector found in $\%\ ax$ ; and cache the corresponding descriptor from the ; descriptor table in memory The caching of the descriptor happens once per execution of the "mov % fs, % ax" instruction. Subsequently, and possibly repeatedly, the register % fs can be used to access memory. At the time of the memory access, however, it does not matter what selector value is in % fs and it does not matter whether the descriptor is even present in memory anymore. As will be described below, the information that was cached when the segment register assignment took place (described above) will be used.

A general overview of segmented memory and access has been described above, prior to describing various embodiments of the present invention, and in order to place those embodiments in context. This overview was not intended to be a complete explanation as the concepts are well known to those of ordinary skill in the art.

To aid in explanation, certain labeling conventions will be used throughout this specification. These labeling conventions are not part of the invention, unless explicitly recited in an attached claim, and are not intended to limit the scope of any claims in this application.

NOTATION

If a range "r" is closed on both ends, i.e., from lowaddr to highaddr, it is represented as r [lowaddr, highaddr].

An address "addr" is within the range: r [lowaddr, highaddr] if and only if: lowaddr<=addr<=highaddr The highest valid value of the range "r" is r.highaddr.

The lowest valid value of the range "r" is r.lowaddr.

The size, r.size, of the range "r" is determined as follows:

IF $r$.highaddr$>=r$.lowaddr THEN $r$.size$=(r$.highaddr$-r$.lowaddr$+1)$ ELSE $r$.size$=0$ Accordingly, the valid range of addresses for a segment, according to the values in the respective segment descriptor is:

| limit_type | range [range.lowaddr, range.highaddr] |
|---|---|
| expand_up | [0, limit] |
| grow_down | [limit + 1, $2^{limit\_size} - 1$] |

To perform these memory segment checks efficiently, the following information is precomputed for a segment_register when a segment_selector is assigned to it.

As shown in FIG. 3, one or more cached optimized segment registers OSR 300-1 . . . 300-n according to an embodiment of the present invention are provided. It should be noted that the optimized segment registers 300 are shown in table form merely to aid in the explanation. Each optimized segment register 300 includes a segment selector SEGSEL as described above in addition to a plurality of SPAN values. The SPAN values, and how they are determined and used to validate a memory access, will be described in more detail below. The optimized segment registers 300 are cached for use by the optimized segment check that occurs when the segment_access, as part of the instruction translation is executed at runtime.

The following pseudo-code, in conjunction with the method 400 as shown in FIGS. 4, 4-A, 4-B and 4-C, describes how the SPAN values are calculated.

Thus, when segment selectors are assigned to a segment register, Steps 402, 404, the following is computed:

```
IF (segment_descriptor.limit_type = expand_up) THEN      :Step 406
                                                         :Step 408
    loAddr = 0
    span16 = segment_descriptor.limit + 1 – max_operand_size
    span32 = span16
    span16_big = segment_descriptor.limit + 1 –
    max_operand_size_big
    span32_big = span16_big
ELSE
                                                         :Step 410
    segment_descriptor.limit_type = grow_down
    loAddr = segment_descriptor.limit + 1
    hiAddr16 = 2^16 – max_operand_size
    hiAddr32 = 2^32 – max_operand_size
    hiAddr16_big = 2^16 – max_operand_size_big
    hiAddr32_big = 2^32 – max_operand_size_big
    IF hiAddr16 >= loAddr THEN                           :Step 412
        span16 = hiAddr16 – loAddr + 1                   :Step 414
    ELSE
        span 16 =0                                       :Step 416
    END IF
    IF hiAddr32 >= loAddr THEN                           :Step 418
        span32 = hiAddr32 – loAddr + 1                   :Step 420
    ELSE
        span32 =0                                        :Step 422
    END IF
    IF hiAddr16_big >= loAddr THEN                       :Step 424
        span16_big =hiAddr16_big – loAddr + 1            :Step 426
    ELSE
        span16_big =0                                    :Step 428
    END IF
    IF hiAddr32_big >= loAddr THEN                       :Step 430
        span32_big = hiAddr32_big – loAddr + 1           :Step 432
    ELSE
        span32_big = 0                                   :Step 434
    END IF
END IF
opt_segment_register.loAddr = loAddr                     :Step 436
IF segment_descriptor.access_rights = write THEN         :Step 438
    opt_segment_register.span16W = span16                :Step 440
    opt_segment_register.span16W_big = span16_big
    opt_segment_register.span32W = span32
    opt_segment_register.span32W_big = span32_big
ELSE
    opt_segment_register.span16W = 0                     :Step 442
    opt_segment_register.span16W_big = 0
    opt_segment_register.span32W = 0
    opt_segment_register.span32W_big = 0
END IF
IF segment_descriptor.access_rights = read THEN          :Step 444
    opt_segment_register.span32R = span32                :Step 446
    opt_segment_register.span16R = span16
    opt_segment_register.span16R_big = span16_big
    opt_segment_register.span32R_big = span32_big
ELSE
    opt_segment_register.span32R = 0                     :Step 448
    opt_segment_register.span16R = 0
    opt_segment_register.span16R_big = 0
    opt_segment_register.span32R_big = 0
END IF
```

The maximum number of bits needed to hold the results of the foregoing calculations, i.e., both the intermediate and final values, is 33. This maximum number of bits is one more than the maximum size of the input value, i.e., the segment_descriptor.limit value. Of course, commonly available 64-bit hardware can be used for these calculations.

It should be noted that there are two variables in the foregoing calculations of SPAN values for a given optimized segment register described above: max_operand_size and max_operand_size_big. The invention can also be implemented with only one max_operand_size value and, therefore, only one set of SPAN values. It has been observed that when such a max_operand_size value is set to a relatively low value, for example, four, most instructions, except for a few complex instructions that operate on the stack are properly handled by the optimized access operation.

For the more complex instructions, a better value is 32. This higher value, however, would result in more valid access requests being incorrectly identified as invalid, with respect to the less complex instructions. While it would take less computations if there were only one value for the calculation and, therefore, only one set of SPAN values, having two sets of SPANs, one normal (operand size four) and one big (operand size 32), advantageously allows the system to select which set to use based on the instruction opcode.

Of course, a system with only one value, e.g., just max_operand_size, could be implemented in accordance with the teachings presented herein and have just one set of SPAN values stored.

Subsequent to the loading of the segment registers, when a segment_access operation, i.e., a memory access which is typically an operand for an instruction that accesses memory, is encountered, the binary translator, in accordance with an embodiment of the present invention, emits code that will use the corresponding cached optimized segment register 300 to determine validity of the access request.

Generally, referring to the method 500 as shown in FIGS. 5, 5-A and 5-B, at step 502, a segment_access operation is detected. The parameters of the segment_access are identified, step 504:
    segment_access.segment_register,
    segment_access.access_type,
    segment_access.address,
    segment_access.address_size, and
    segment_access.operand_size.

At step 506 the optimized segment register 300 corresponding to the segment_access.segment_register value is identified and the corresponding low address value, opt_segment_register.loaddr, is retrieved, step 508.

At step 510, if the segment_access.operand_size value is greater than or equal to a predetermined threshold value, big_threshold, then control passes to step 512 where the appropriate SPAN value is retrieved from the BIG side of the table shown in FIG. 6. The SPAN value is retrieved as a function of the segment_access.address_size and segment_access.access_type values.

Alternately, step 510, if the segment_access.operand_size value is less than the predetermined threshold value, big_threshold, then control passes to step 514 where the appropriate SPAN value is retrieved from the "NORMAL" side of the table shown in FIG. 6. The SPAN value is retrieved as a function of the segment_access.address_size and segment_access.access_type values.

At step 516, a difference, DIFF, between the segment_access.address value and loaddr is calculated using a 64 bit operation. This DIFF value is then compared to the retrieved SPAN value using an unsigned 64 bit operation at step 518. If loAddr is greater than address, a 2's complement underflow occurs during the difference operation, creating a number that is larger (unsigned) than SPAN. Because an unsigned comparison operation is being performed, if, for example, the SPAN value is zero, no DIFF value will be less than the SPAN value thus causing any address value to be rejected. So, for example, a write reference to a read-only memory segment will see a SPAN write value of zero and be rejected.

If DIFF is less than SPAN, then control passes to step 520 where it is determined that the access request is valid and binary translation continues at step 522. Alternately, control passes to step 524 where the segment access is rejected. The optimized check is conservative in that it will, in some cases, reject a valid reference. Therefore, when the optimized check rejects a reference, an out of line, complete, check is performed, step 526, which rejects only truly invalid references.

When discussing binary translation, it is noted that there are two phases of operation: (1) translating code and (2) executing the translated code. Phase (1) happens first, of course, and it often is done lazily (on demand). Phase (2) happens repeatedly. In other words, a system may translate a basic block, also referred to as a translation unit, once, but execute it thousands, or even billions, of times. Sometimes translated code is lost (invalidated) in which case it may need to be retranslated, but again, this retranslation will typically be followed by many executions of the code.

This distinction between translation and (subsequent) execution of code is the very reason binary translation delivers good performance: the cost of translating may be high, but this cost is amortized over many subsequent executions of the emitted code, so the cost of the translation process per execution of the emitted code is negligible.

Advantageously, with respect to memory segment checks, embodiments of the present invention further improve the benefits of binary translation. As described herein, these checks are performed when the translated code executes and are not performed at translation time. The reason is that the translation time values of registers, memory addresses, segment registers (selectors) and descriptors may not remain valid for all future executions of the translated code. So instead of performing segment checks at translation time, the translator will emit code that when executed will perform the segment checks.

Accordingly, it is not important how much work the translator does (at translation time) to emit code because the resulting (emitted) code executes fast when it later runs (possibly millions of times).

Of course, one of ordinary skill in the art will see that some of the steps of method 500 may be performed at translation time only with other steps being performed at runtime only. In one embodiment of the present invention, steps 506, 510 are performed at translation time only, not at runtime. Steps 508, 512 or 514, 516 and 518 are emitted as part of the translation, and are performed only at runtime, not at translation time. One of ordinary skill in the art will also understand that different combinations of runtime and translation time operation are possible.

Advantageously, in one embodiment of the present invention, a small, compact, expression is actually executed at runtime. A pseudo-code for this expression is presented as:

$$addr_{64} - segment\_register.loAddr \underset{u64}{<} segment\_register.SPAN$$

There are various optimizations that may be applied to embodiments of the present invention. In one, it is known that a particular segment register always contains an expand_up memory segment. As a result, the loAddr is always zero and the subtract operation, Step 516, can be eliminated.

It is known that specific segment registers are reserved for particular types of memory accesses, e.g., the stack segment register. Since they have specific uses, the distribution of sizes of uses of the segment registers differ. In particular it is much more common to see larger (greater than 8 byte) accesses to the stack segment than any other segment because x86 contains special purpose instructions that only operate on the stack segment.

In one embodiment, where generally only instructions that operate on the stack segment use big operands, both the max_operand_size_big variable and the max_operand_size variable, along with the corresponding big SPAN values and normal SPAN values, respectively, are used for the stack segment register; while only the max_operand_size variable and the corresponding normal SPAN values are used for all other segment registers. In other embodiments, adaptive techniques may be used to determine whether to use the max_operand_size_big variable and the corresponding big SPAN values in connection with other segment registers. For example, such an adaptive technique could involve monitoring how often valid segment accesses are identified as being invalid and using the max_operand_size_big variable and the corresponding big SPAN values when the frequency of such errors is excessive, such as when a predetermined threshold for such errors is reached. When a decision is made to begin using the max_operand_size_big variable and the corresponding big SPAN values for a particular segment register, new binary translations would need to be generated for instructions that use that segment register.

In general terms, embodiments of this invention comprise computer-implemented methods for determining information about the span of a segment and using this span information to quickly screen for possible invalid segment accesses. The span information may be determined from a segment descriptor when a segment selector is loaded into a segment register. Embodiments may also involve determining access-rights information for the memory segment, indicating what types of accesses to the segment are permitted. The span information and/or the access-rights information may be saved for subsequent screening for possible segment access violations. A binary translator may emit code that accesses and uses the span information and/or the access-rights information to assess whether an attempted access to the memory segment may be invalid. If the screening suggests that an access may be invalid, then another check is performed to ascertain definitively whether the access is valid. Thus, a first, non-definitive test or check screens for possible invalid accesses and a second, definitive test or check is performed, when the first test results indicate a possible invalid access, to ascertain definitively whether or not the access is invalid. The first test may be performed by code emitted by a binary translator, in-line with other binary translation code, while the second test may be performed after a context switch, by higher level virtualization software.

The detailed embodiment described above involves saving span information and access-rights information in the form of a low address value and a plurality of SPAN values for each memory segment. The low address value indicates the lowest address within the segment. The access-rights information is incorporated into the SPAN values by selectively setting certain SPAN values to zero to indicate that corresponding types of access are not permitted. For non-zero SPAN values, the values indicate the span or length that the memory segment extends beyond the low address value. Span information and access-rights information may alternatively be stored in other forms, in other embodiments. For example, the access-rights information can be specified separately, instead of incorporating the information into the SPAN values. As another example, a high address, indicating the highest address within the segment, may be stored instead of a span value.

Embodiments of the invention may also determine and utilize information about the size of the operand involved in the segment access. In the detailed embodiment described above, this operand-size information is also incorporated into the plurality of SPAN values, in that there are a first set of SPAN values for "normal", smaller operands and a second set of SPAN values for "big", larger operands. The in-line screening test involves the use of the normal SPAN values when a segment access relates to a smaller operand, and the test involves the use of the big SPAN values when a segment access relates to a larger operand. Other techniques may also be used to store and utilize operand-size information.

As is clear from the present description, embodiments of the present invention do not require any particular hardware platform. Nonetheless, because it is so common, and by way of example only, it is assumed below that an x86 architecture, e.g., as used in the Intel IA32 line of microprocessors, is being used.

General System Structure

Figure 7:
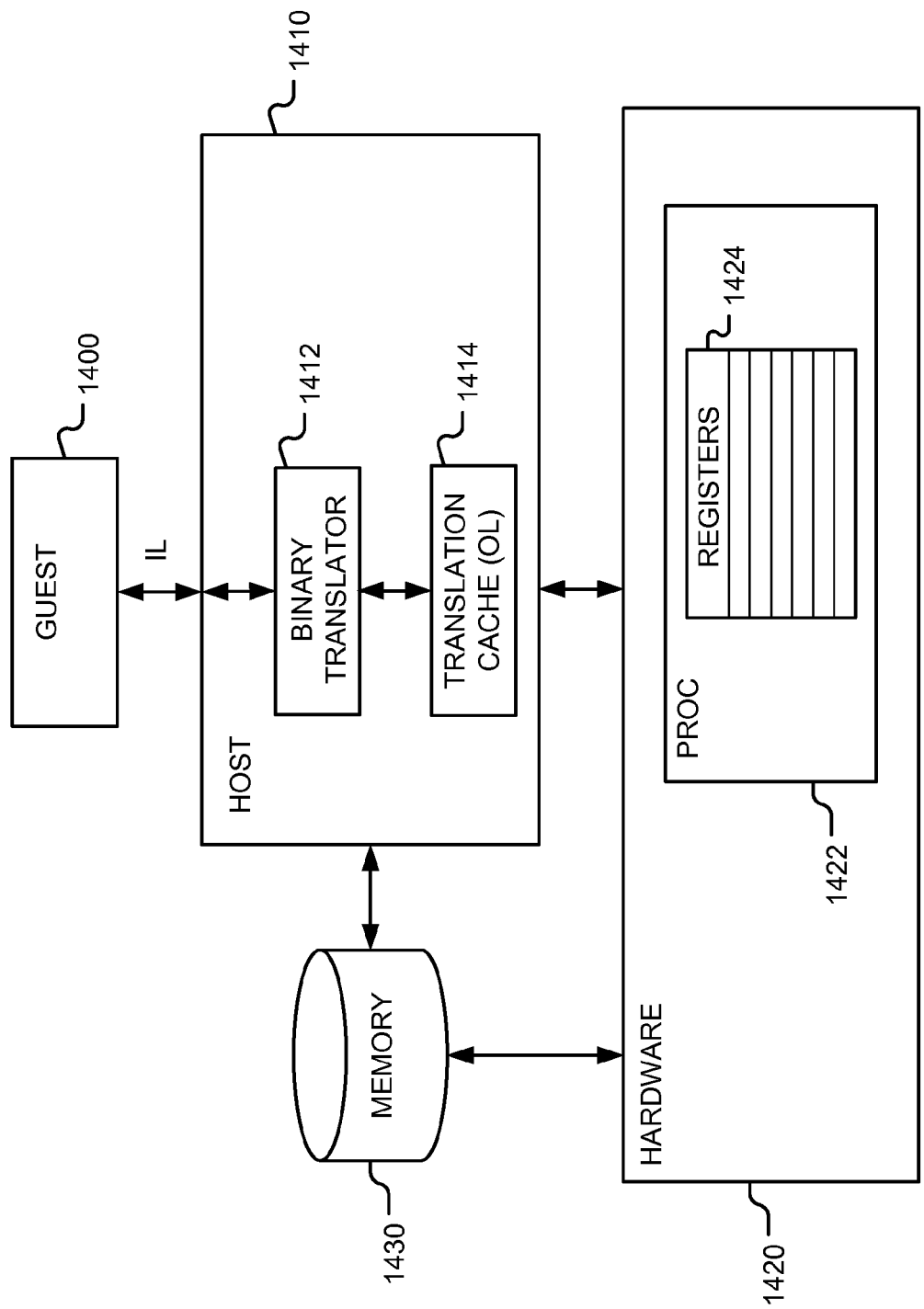
FIG. 7 is a system on which the foregoing methods may be implemented.

The general structure of a system according to embodiments of the present invention is shown in FIG. 7. One or more guest programs or systems 1400 (which execute IL instructions) are connected via a host system 1410 (which executes OL instructions) to run on an underlying hardware platform 1420, which includes a hardware processor 1422 and includes various hardware registers 1424. Software registers may also be used, although these will normally be slower. A conventional memory 1430 is included, which may include both volatile and non-volatile storage.

Examples of the many types of guest systems that may use embodiments of the present invention range from a simple, conventional application program to a full-scale virtual machine that includes its own virtual operating system, virtual memory, etc. The guest 1400 issues instructions in the input language (IL), whereas it is assumed that the hardware requires instructions in the output language (OL). Note that the input and output languages may actually be the same, or that one may be a subset of the other, but that binary translation between the guest and hardware is used in whole or in part for other reasons, such as to completely virtualize or emulate the guest. In such cases, it may not be necessary to have an actual, physical hardware system at all; rather, the guest may itself be running on a virtual machine or, for example, an emulation of the hardware platform.

The host system 1410 includes a binary translator 1412, which will typically be a software module, as well as a translation cache 1414, which stores the output of the binary translator, that is, the IL-to-OL translated instructions. The general design and function of a binary translator and its connected translation cache are well known and are not described in detail below; of course, the specific improvements to the binary translator provided by this invention are.

The system will of course contain other hardware and software components that are well known. These are consequently not illustrated nor described here as the present invention does not depend on any particular implementation of these components. For example, the host system 1410 may include, be connected to, function as, or replace the conventional host operating system found in most modern computers.

The foregoing embodiments of the present invention may be implemented on one or more of the products available from VMware, Inc. of Palo Alto, Calif.

The term "optimize" (and related terms, such as optimization) can have different meanings in different contexts. For example, in some contexts, the term "optimize" can mean "to make as perfect, effective, or functional as possible." This is not how the term is used in this patent. Instead, in this patent, the term "optimize" is used in an ordinary manner in the field of computer science to indicate improvement, but not necessarily perfection.

It is to be appreciated that embodiments of the methods and apparatuses discussed herein are not limited in application to the details of construction and the arrangement of components or steps set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one of the embodiments are not intended to be excluded from a similar role in any other embodiments. Also, the phraseology and terminology used herein are for the purpose of description and should not be regarded as limiting. The use herein of "including," "comprising," "having," "containing," "involving," and variations thereof, is meant to encompass the items listed thereafter and equivalents thereof as well as additional items.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g., diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of optimizing processing of memory references in a virtualization environment, the method comprising:
   identifying an assignment of a first segment selector to a first segment register;
   retrieving a first segment descriptor corresponding to the first segment selector;
   calculating a first low address value;
   calculating a first plurality of span values as a function of the first segment descriptor; and
   storing the first plurality of span values in a first optimized segment register corresponding to the first segment register.

2. The method of claim 1, wherein the first segment descriptor comprises:
   a first access rights value (ARV), a first limit type value (LTV), a first limit address value (LAV) and a first limit size value (LSV),
   wherein the first plurality of span values is calculated as a function of the first ARV, the first LTV, the first LAV, the first LSV and a first operand size value.

3. The method of claim 2, further comprising:
   calculating a second plurality of span values as a function of the first ARV, the first LTV, the first LAV, the first LSV and a second operand size value; and
   storing the second plurality of span values in the first optimized segment register;
   wherein the second operand size value is greater than the first operand size value.

4. The method of claim 3, wherein calculating the second plurality of span values comprises:
   calculating third and fourth span read values; and
   calculating third and fourth span write values.

5. The method of claim 2, wherein calculating the first low address value is a function of the first limit type value.

6. The method of claim 2, wherein calculating the first plurality of span values comprises:
   calculating first and second span read values; and
   calculating first and second span write values.

7. A computer program product stored on a computer readable medium and configured to perform a computer-implemented method of optimizing processing of memory references in a virtualization environment, the method comprising:
   identifying an assignment of a first segment selector to a first segment register;
   retrieving a first segment descriptor corresponding to the first segment selector;
   calculating a first low address value;
   calculating a first plurality of span values as a function of the first segment descriptor; and
   storing the first plurality of span values in a first optimized segment register corresponding to the first segment register.

8. The computer program product of claim 7, wherein the first segment descriptor comprises:
   a first access rights value (ARV), a first limit type value (LTV), a first limit address value (LAV) and a first limit size value (LSV),
   wherein the first plurality of span values is calculated as a function of the first ARV, the first LTV, the first LAV, the first LSV and a first operand size value.

9. The computer program product of claim 8, the method further comprising:
   calculating a second plurality of span values as a function of the first ARV, the first LTV, the first LAV, the first LSV and a second operand size value; and
   storing the second plurality of span values in the first optimized segment register,
   wherein the second operand size value is greater than the first operand size value.

10. The computer program product of claim 9, wherein calculating the second plurality of span values comprises:
    calculating third and fourth span read values; and
    calculating third and fourth span write values.

11. The computer program product of claim 8, wherein calculating the first low address value is a function of the first limit type value.

12. The computer program product of claim 8, wherein calculating the first plurality of span values comprises:
    calculating first and second span read values; and
    calculating first and second span write values.

13. A computer system including a storage device storing computer instructions configured to perform a computer-implemented method of optimizing processing of memory references in a virtualization environment, and one or more central processing units for executing the computer instructions, the method comprising:
    identifying an assignment of a first segment selector to a first segment register;
    retrieving a first segment descriptor corresponding to the first segment selector;
    calculating a first low address value;
    calculating a first plurality of span values as a function of the first segment descriptor; and
    storing the first plurality of span values in a first optimized segment register corresponding to the first segment register.

14. The computer system of claim 13, wherein the first segment descriptor comprises:
    a first access rights value (ARV), a first limit type value (LTV), a first limit address value (LAV) and a first limit size value (LSV),
    wherein the first plurality of span values is calculated as a function of the first ARV, the first LTV, the first LAV, the first LSV and a first operand size value.

15. The computer system of claim 14, the method further comprising:

calculating a second plurality of span values as a function of the first ARV, the first LTV, the first LAV, the first LSV and a second operand size value; and storing the second plurality of span values in the first optimized segment register, wherein the second operand size value is greater than the first operand size value.

16. The computer system of claim 15, wherein calculating the second plurality of span values comprises:
calculating third and fourth span read values; and
calculating third and fourth span write values.

17. The computer system of claim 14, wherein calculating the first low address value is a function of the first limit type value.

18. The computer system of claim 14, wherein calculating the first plurality of span values comprises:
calculating first and second span read values; and
calculating first and second span write values.

19. A method of validating an instruction, the method comprising:
receiving a first memory access instruction;
determining a first segment register identified by the first memory access instruction;
determining a first optimized segment register corresponding to the first segment register;
retrieving a first low address value from the first optimized segment register;
retrieving a first span value from the first optimized segment register as a function of one or more parameters of the first memory access instruction; and
determining validity of the first memory access instruction as a function of the first span value and the first low address value.

20. The method of claim 19, wherein the first span value is retrieved as a function of a first access type value in the first memory instruction.

21. The method of claim 19, wherein determining validity of the first memory access comprises:
determining a first memory address value identified by the first memory access instruction;
calculating a difference between the first memory address value and the retrieved first low address value; and
comparing the calculated difference to the first span value.

22. The method of claim 21, wherein comparing the calculated difference to the first span value comprises:
determining whether the calculated difference is less than the first span value.

23. The method of claim 21 wherein calculating the difference between the first memory address value and the retrieved first low address value is a 64-bit operation, and
wherein comparing the calculated difference to the first span value is an unsigned 64-bit operation.

24. A computer program product stored on a computer readable medium and configured to perform a computer-implemented method of validating an instruction, the method comprising:
receiving a first memory access instruction;
determining a first segment register identified by the first memory access instruction;
determining a first optimized segment register corresponding to the first segment register;
retrieving a first low address value from the first optimized segment register;
retrieving a first span value from the first optimized segment register as a function of one or more parameters of the first memory access instruction; and
determining validity of the first memory access instruction as a function of the first span value and the first low address value.

25. The computer program product of claim 24, wherein the first span value is retrieved as a function of a first access type value in the first memory instruction.

26. The computer program product of claim 24, wherein determining validity of the first memory access comprises:
determining a first memory address value identified by the first memory access instruction;
calculating a difference between the first memory address value and the retrieved first low address value; and
comparing the calculated difference to the first span value.

27. The computer program product of claim 26, wherein comparing the calculated difference to the first span value comprises:
determining whether the calculated difference is less than the first span value.

28. The computer program product of claim 26, wherein calculating the difference between the first memory address value and the retrieved first low address value is a 64-bit operation, and
wherein comparing the calculated difference to the first span value is an unsigned 64-bit operation.

29. A computer system including a storage device storing computer instructions configured to perform a computer-implemented method of validating an instruction, and one or more central processing units for executing the computer instructions, the method comprising:
receiving a first memory access instruction;
determining a first segment register identified by the first memory access instruction;
determining a first optimized segment register corresponding to the first segment register;
retrieving a first low address value from the first optimized segment register;
retrieving a first span value from the first optimized segment register as a function of one or more parameters of the first memory access instruction; and
determining validity of the first memory access instruction as a function of the first span value and the first low address value.

30. The computer system of claim 29, wherein the first span value is retrieved as a function of a first access type value in the first memory instruction.

31. The computer system of claim 29, wherein determining validity of the first memory access comprises:
determining a first memory address value identified by the first memory access instruction;
calculating a difference between the first memory address value and the retrieved first low address value; and
comparing the calculated difference to the first span value.

32. The computer system of claim 31, wherein comparing the calculated difference to the first span value comprises:
determining whether the calculated difference is less than the first span value.

33. The computer system of claim 31 wherein calculating the difference between the first memory address value and the retrieved first low address value is a 64-bit operation, and
wherein comparing the calculated difference to the first span value is an unsigned 64-bit operation.

* * * * *